No. 727,482. Patented May 5, 1903.

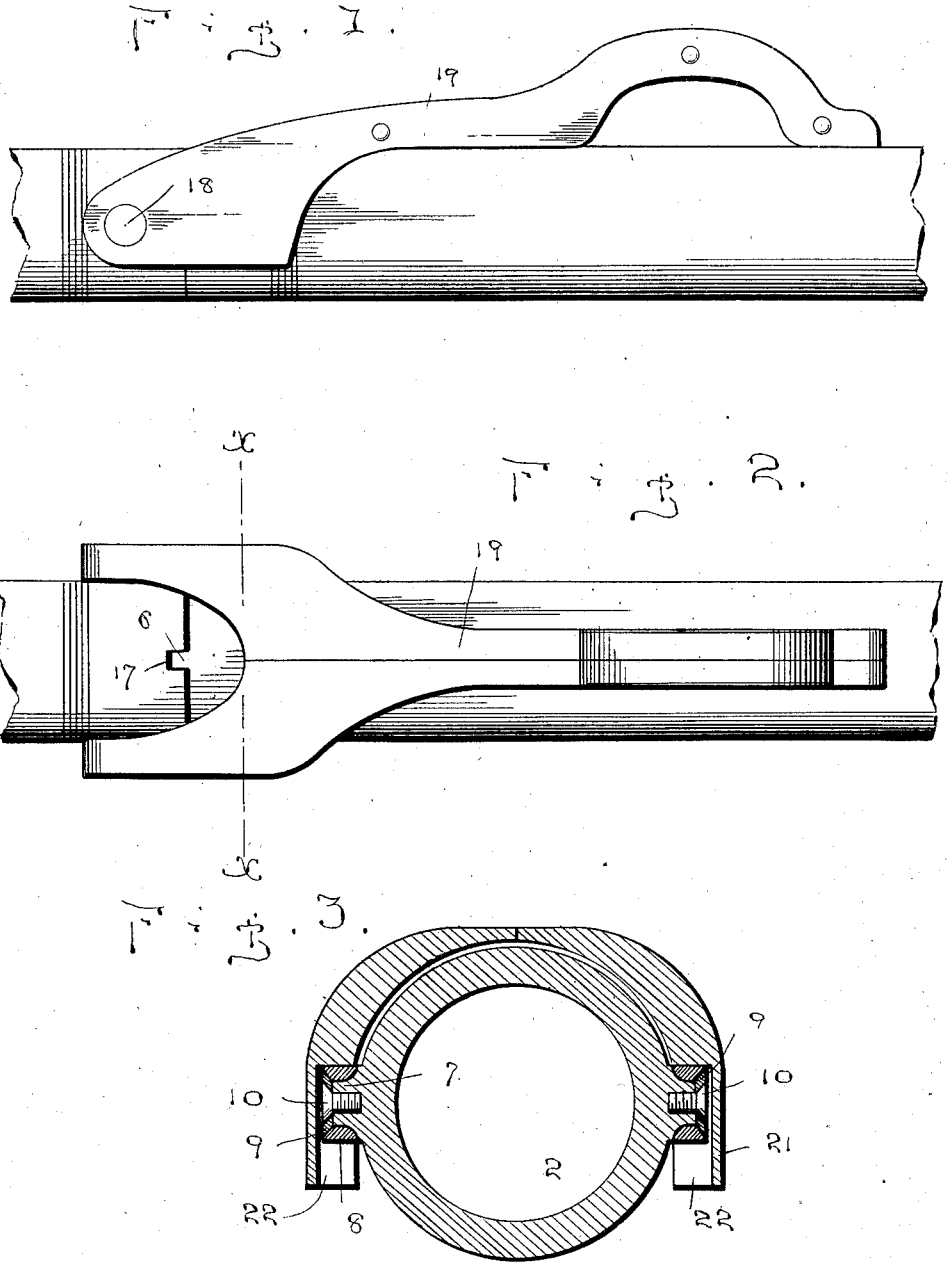

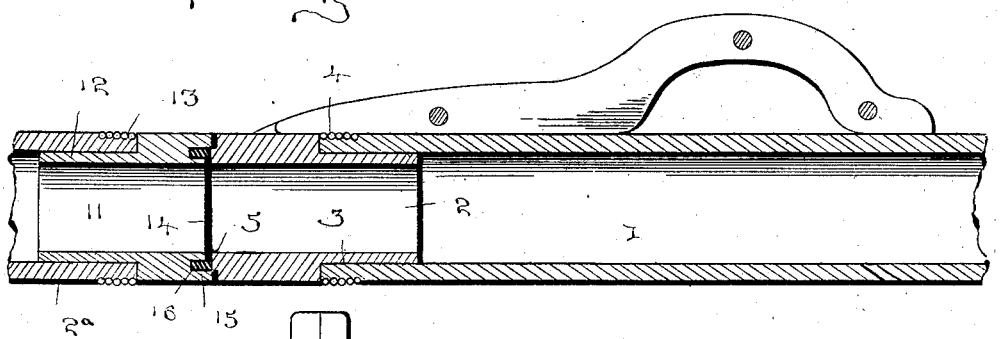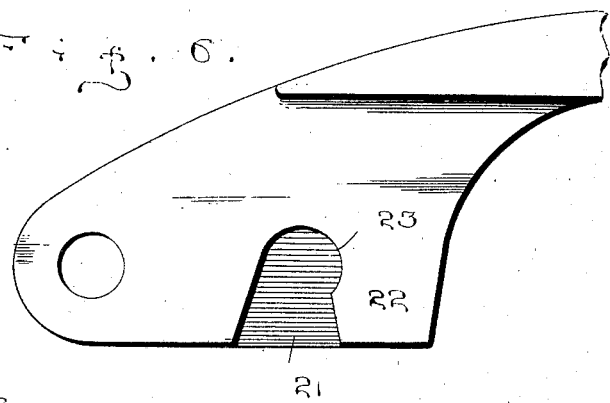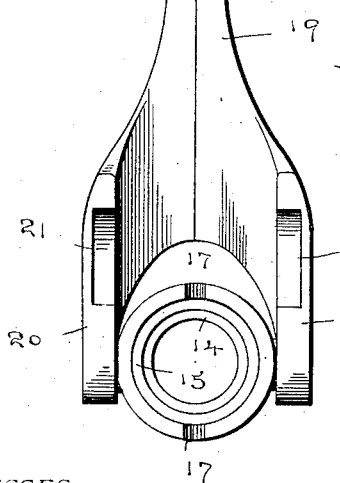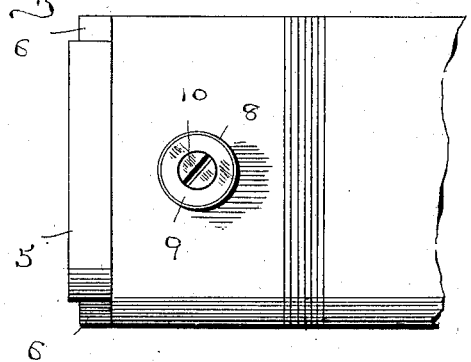

UNITED STATES PATENT OFFICE.

THOMAS STRBA AND SAMUEL STRBA, OF ALLEGHENY, PENNSYLVANIA.

HOSE-COUPLING.

SPECIFICATION forming part of Letters Patent No. 727,482, dated May 5, 1903.

Application filed December 17, 1902. Serial No. 135,584. (No model.)

*To all whom it may concern:*

Be it known that we, THOMAS STRBA and SAMUEL STRBA, citizens of the United States, residing at Allegheny, in the county of Allegheny and State of Pennsylvania, have invented new and useful Improvements in Hose-Couplings, of which the following is a specification.

Our invention relates to new and useful improvements in hose-couplings; and its object is to provide a device of this character whereby the adjoining ends of two sections of hose may be securely clamped together and locked in such position against accidental disengagement.

A further object is to provide rollers for reducing friction in the operation of clamping the ends of the hose together, said rollers being mounted in a novel manner.

With the above and other objects in view the invention consists in providing tubular ends to the hose, which are suitably secured in position therein and one of which has an annular tongue or flange adapted to project into a recess formed in the end of the adjacent tubular end, suitable packing being provided within this recess whereby a water-tight joint may be obtained when the two parts are clamped together. Lugs also extend from one member into recesses formed within the other and prevent rotation of one independently of the other. At opposite sides of one of the tubular sections are formed ears, upon which are arranged rotary rings or rollers, which are held in position thereon by washers, through which extend screws or other suitable locking means engaging the center of the lugs. These rollers are adapted to be engaged by the inner recessed faces of a forked lever pivoted to opposite sides of the tubular end portion, and these recesses have cam-faces, so shaped as to draw the two ends together when the lever is pressed down upon the rollers and finally lock the same against accidental disengagement.

The invention also consists in the further novel construction and combination of parts hereinafter more fully described and claimed, and illustrated in the accompanying drawings, showing the preferred form of our invention, and in which—

Figure 1 is a side elevation showing two sections of a hose secured together by means of our improved coupling. Fig. 2 is a plan view thereof. Fig. 3 is a section on line $x\,x$ of Fig. 2. Fig. 4 is a central longitudinal section. Fig. 5 is an end view of one of the sections detached, the cam-lever being shown in raised position. Fig. 6 is an elevation of the inner face of one of the forks of the cam-lever; and Fig. 7 is a side elevation of the end of one of the hose-sections and showing a roller in position thereon.

Referring to the figures by numerals of reference, 1 and $2^a$ are hose-sections, and within one end of section 1 is fitted a tubular head 2, preferably reduced in diameter at the rear end thereof, as shown at 3, to permit the end of the hose to be secured thereon in any suitable manner, as by means of binding-wire 4. An annular flange or tongue 5 is arranged at the outer end of this head, and extending laterally from the flange at opposite sides thereof are lugs 6. Studs 7 are arranged at opposite sides of the head 2, and upon each is mounted a revoluble ring or roller 8, the outer edge of which is preferably tapered inward to receive a washer 9, having a beveled edge. This washer is secured to the stud preferably by means of a screw 10, which extends into the stud. Within one end of hose-section $2^a$ is secured a head 11, the inner end of which is also preferably reduced, as shown at 12, whereby the end of the hose may be bound or otherwise secured thereon, as by means of wire 13. The outer end of this head has a recess 14 therein, within the bottom of which is formed a groove 15 for the reception of a packing-ring 16. The recess 14 is of sufficient size to receive the annular flange 5, before referred to. Within opposite sides of the end of the head are formed recesses 17, which are adapted to receive the lugs 6 when the two heads 2 and 11 are secured together.

Upon opposite sides of the head 11 are formed lugs 18, each of which is adapted to serve as a bearing for one of two similar sections of a forked lever 19. These sections are clamped together in any suitable manner, and the forked end extends over and partly around the head 11. Within the inner face of each member 20 of the forked end of the lever is formed a recess 21, one edge of which—i. e., the edge farthest removed from the lug 18—is inclined, as shown at 22, and merges at its inner end into a recess or concave portion 23.

When it is desired to connect the sections of the hose together, the two heads are placed together with flange 5 in recess 14 and lug 6 in recess 17. Lever 19 is then swung downward, and the recesses 21 therein will receive the rollers 8, causing the same to bear upon the inclined edges 22 of the recesses. As the lever 19 is further depressed or swung inward these inclined edges will force the rollers longitudinally and cause the packing-ring 16 to be compressed between the two heads 2 and 11. The rollers will finally be seated within the concave recesses 23 and will be held therein by the slight expansion of the packing-ring 16. The two parts are thus securely locked together and cannot be detached until sufficient pressure is exerted outwardly upon lever 19 to move the rollers longitudinally upon the cam or concave edge of recess 23, and thereby compress the packing-ring 16 and permit the inclined edges 22 to travel outward upon the rollers.

In the foregoing description we have shown the preferred form of our invention; but we do not limit ourselves thereto, as we are aware that modifications may be made therein without departing from the spirit or sacrificing any of the advantages thereof, and we therefore reserve the right to make such changes as fairly fall within the scope of our invention.

Having thus fully described the invention, what is claimed as new, and desired to be secured by Letters Patent, is—

1. In a hose-coupling, the combination with a tubular head having an annular flange at the outer end thereof; of oppositely-disposed lugs upon, and integral with, said flange, oppositely-disposed studs upon the head, rollers mounted thereon and having inwardly-tapered ends, a beveled holding-washer within each tapered end, and means for securing the washers to the studs.

2. In a hose-coupling, the combination with a tubular head having oppositely-disposed lugs thereupon and integral therewith, oppositely-disposed studs upon the head, inwardly-tapered rollers mounted thereon, beveled holding-washers within the rollers and means for securing said washers to the studs; of a tubular head having recesses for the reception of the lugs, a packing-ring interposed between the heads, a forked lever formed of similar sections and straddling and pivoted to said second head, said lever having recesses in its inner faces adapted to receive the rollers, and cam edges to the recesses terminating at their inner ends in locking-recesses for the reception of the rollers.

In testimony whereof we affix our signatures in presence of two witnesses.

THOMAS STRBA.
SAMUEL STRBA.

Witnesses:
CHARLES STUMPF,
AUGUST J. WALDECK.